(12) United States Patent
Soderlind et al.

(10) Patent No.: US 12,162,540 B2
(45) Date of Patent: Dec. 10, 2024

(54) HANDWHEEL ACTUATOR MODULAR INTERFACE

(71) Applicant: Ford Global Technologies, LLC, Dearborn, MI (US)

(72) Inventors: Erik Soderlind, Harrison Township, MI (US); Taras Palczynski, Ann Arbor, MI (US); Steven Amburgy, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 736 days.

(21) Appl. No.: 17/387,094

(22) Filed: Jul. 28, 2021

(65) Prior Publication Data

US 2023/0033934 A1 Feb. 2, 2023

(51) Int. Cl.
  *B62D 5/00* (2006.01)
  *B62D 6/00* (2006.01)

(52) U.S. Cl.
  CPC .............. *B62D 5/006* (2013.01); *B62D 6/008* (2013.01)

(58) Field of Classification Search
  CPC .................................. B62D 5/006; B62D 6/008
  See application file for complete search history.

(56) References Cited

U.S. PATENT DOCUMENTS

| 11,673,601 B2 * | 6/2023 | Soderlind | B62D 5/006 |
| | | | 180/402 |
| 2017/0361867 A1 * | 12/2017 | Lewis | B62D 5/006 |

FOREIGN PATENT DOCUMENTS

| CN | 112881039 A | 6/2021 |
| DE | 102018209236 A1 | 12/2019 |
| DE | 102019123514 A1 | 3/2021 |
| DE | 102019215477 A1 * | 4/2021 |
| JP | 2007030804 A * | 2/2007 |

* cited by examiner

*Primary Examiner* — Jacob D Knutson
(74) *Attorney, Agent, or Firm* — Burr & Forman LLP; Lorne Forsythe

(57) ABSTRACT

A handwheel actuator for a steer by wire system may include a compressive loading assembly, a feedback actuator and a column for operably coupling a handwheel to the handwheel actuator. The column may operably couple a handwheel to the handwheel actuator. The column may include a column shaft extending from a first end of the column to a second end of the column. The feedback actuator may be operably coupled to the second end of the column. The feedback actuator may provide tactile feedback to an operator responsive to movement of the handwheel. The feedback actuator may include a torsion bar substantially coaxial with the column shaft. The compressive loading assembly may be disposed at the second end of the column to operably couple the column shaft and the torsion bar under a compressive load when the column is joined to the feedback actuator.

19 Claims, 12 Drawing Sheets

HANDWHEEL ACTUATOR MODULAR INTERFACE

TECHNICAL FIELD

Example embodiments generally relate to vehicle control technology and, more particularly, relate to an interface between modules (or components) of a handwheel actuator in a steer by wire system.

BACKGROUND

Vehicles are consistently moving toward the integration of electrical or electro-mechanical components that perform various vehicle functions that were previously performed using mechanical linkages. Drive by wire, steer by wire and brake by wire are some examples of this migration away from mechanical linkages. A result of this migration is that vehicles may become lighter, and easier to service and maintain.

However, in spite of the advantages noted above, the design and integration of new components for these systems may sometimes be challenging for manufacturers. Accordingly, it may be desirable to define certain standard interfaces between components so that such components can be reliably integrated into different vehicle models and types regardless of who the individual manufacturers were for specific components.

BRIEF SUMMARY OF SOME EXAMPLES

In accordance with an example embodiment, a handwheel actuator for a steer by wire system may be provided. The handwheel actuator may include a compressive loading assembly, a feedback actuator and a column for operably coupling a handwheel to the handwheel actuator. The column may operably couple a handwheel to the handwheel actuator. The column may include a column shaft extending from a first end of the column to a second end of the column. The feedback actuator may be operably coupled to the second end of the column. The feedback actuator may provide tactile feedback to an operator responsive to movement of the handwheel. The feedback actuator may include a torsion bar substantially coaxial with the column shaft. The compressive loading assembly may be disposed at the second end of the column to operably couple the column shaft and the torsion bar under a compressive load when the column is joined to the feedback actuator.

In another example embodiment, a column for a handwheel actuator of a steer by wire system may be provided. The column may include a column shaft extending from a first end of the column to a second end of the column to operably couple a handwheel to the handwheel actuator, and a compressive loading assembly disposed at the second end of the column to operably couple the column shaft and a torsion bar of a feedback actuator under a compressive load when the column is joined to the feedback actuator. The feedback actuator may be operably coupled to the second end of the column. The feedback actuator may provide tactile feedback to an operator responsive to movement of the handwheel. The torsion bar may be substantially coaxial with the column shaft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3A:
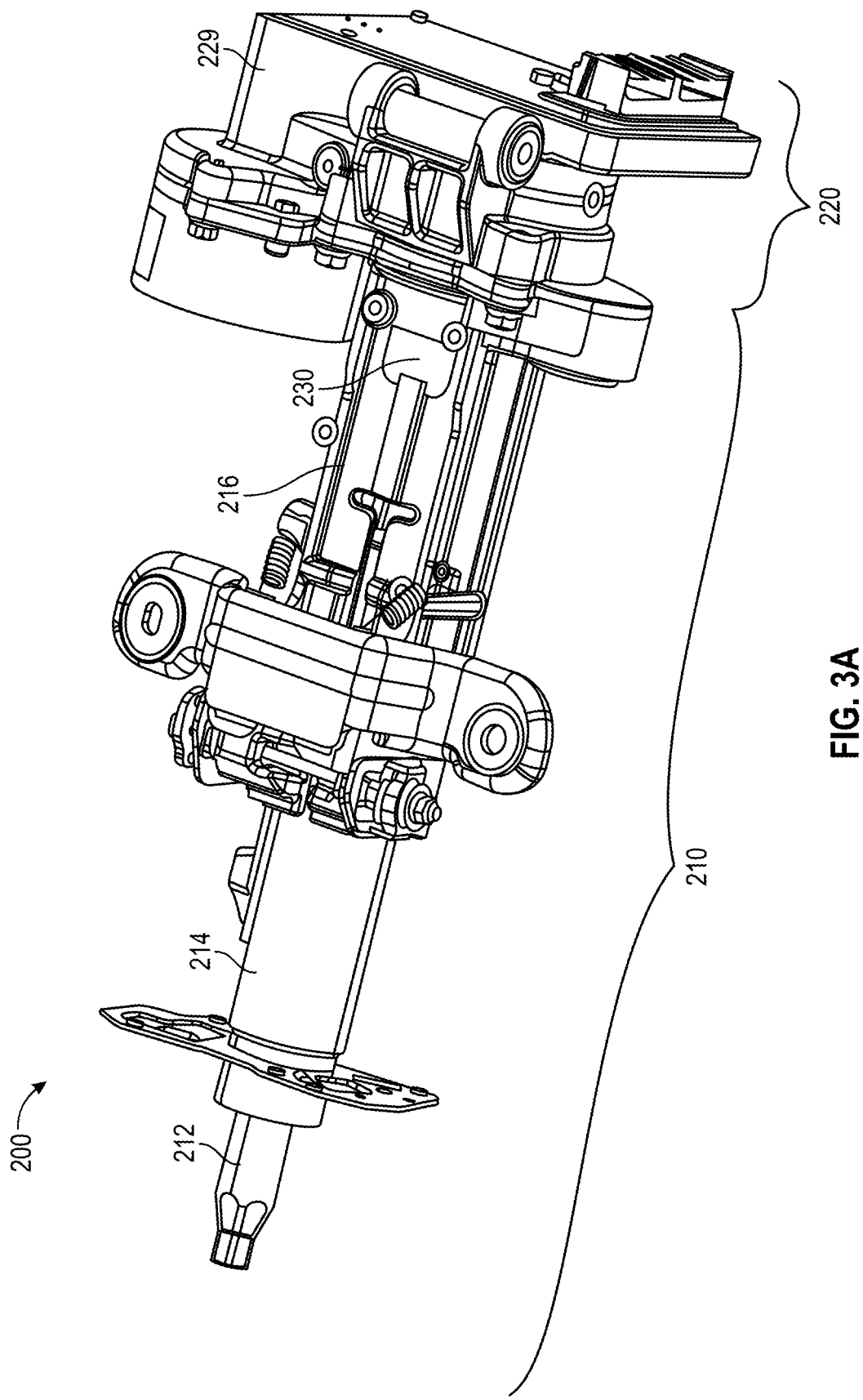
Figure 3B:
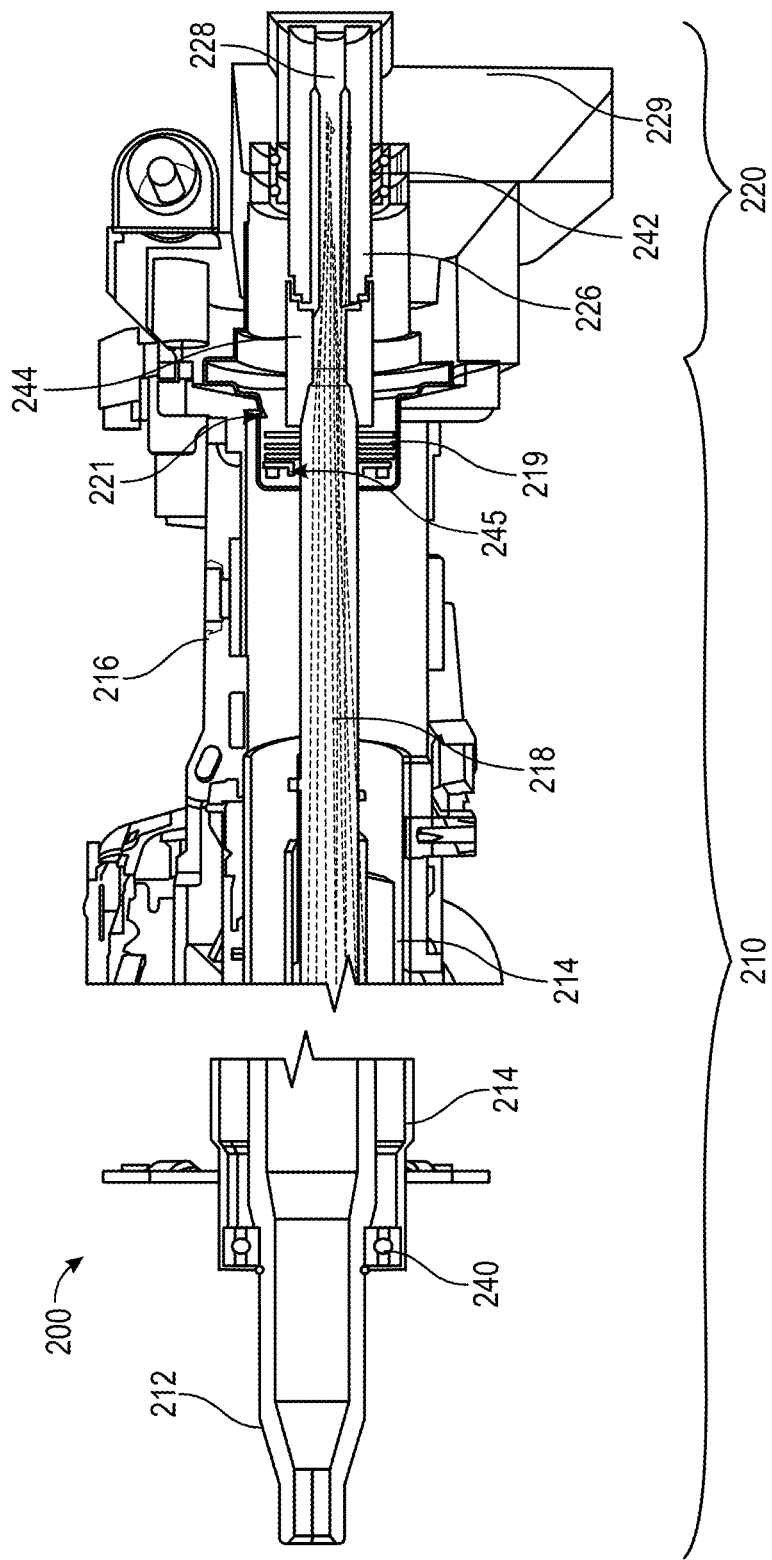
Figure 4:
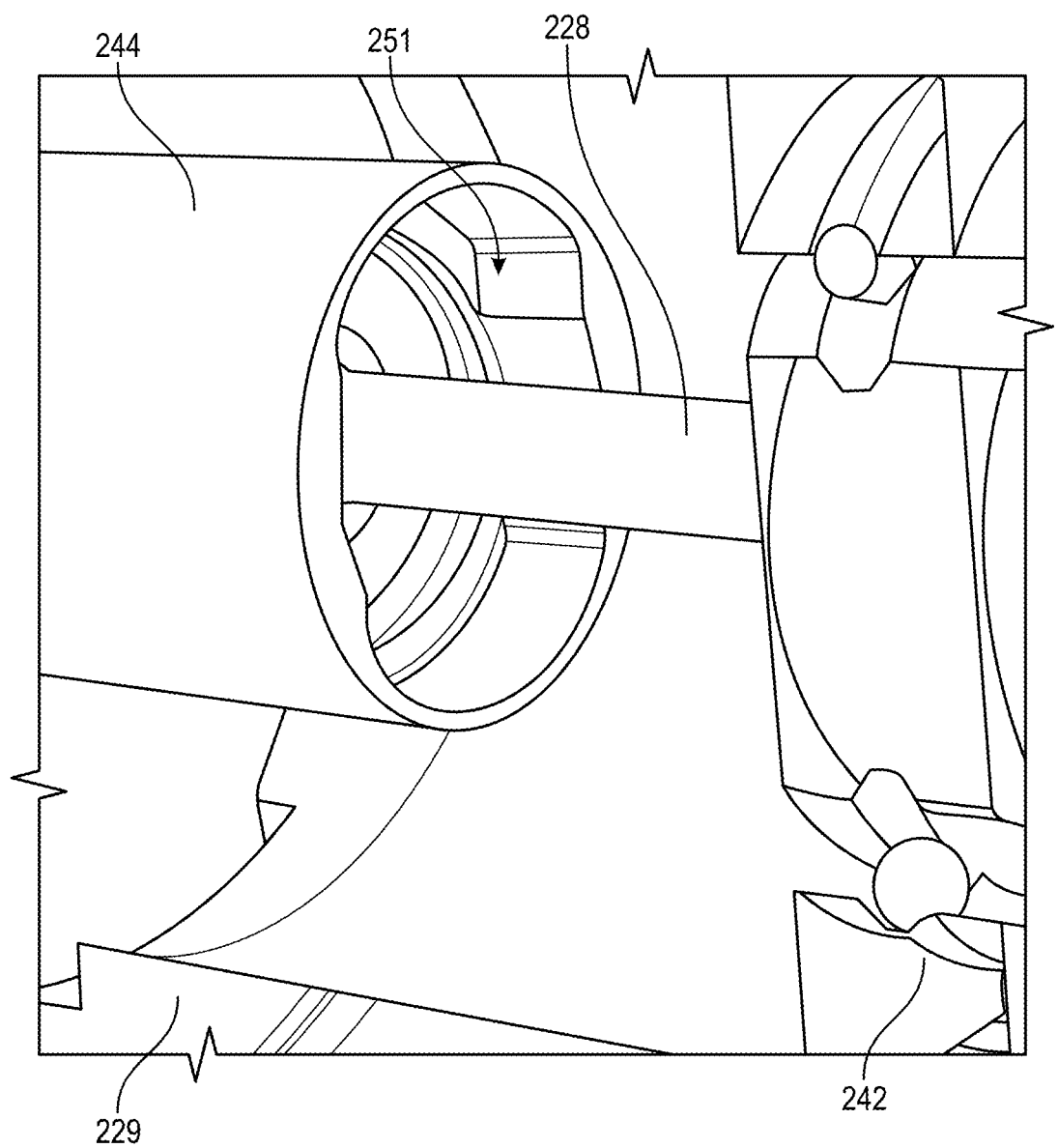
Figure 5:
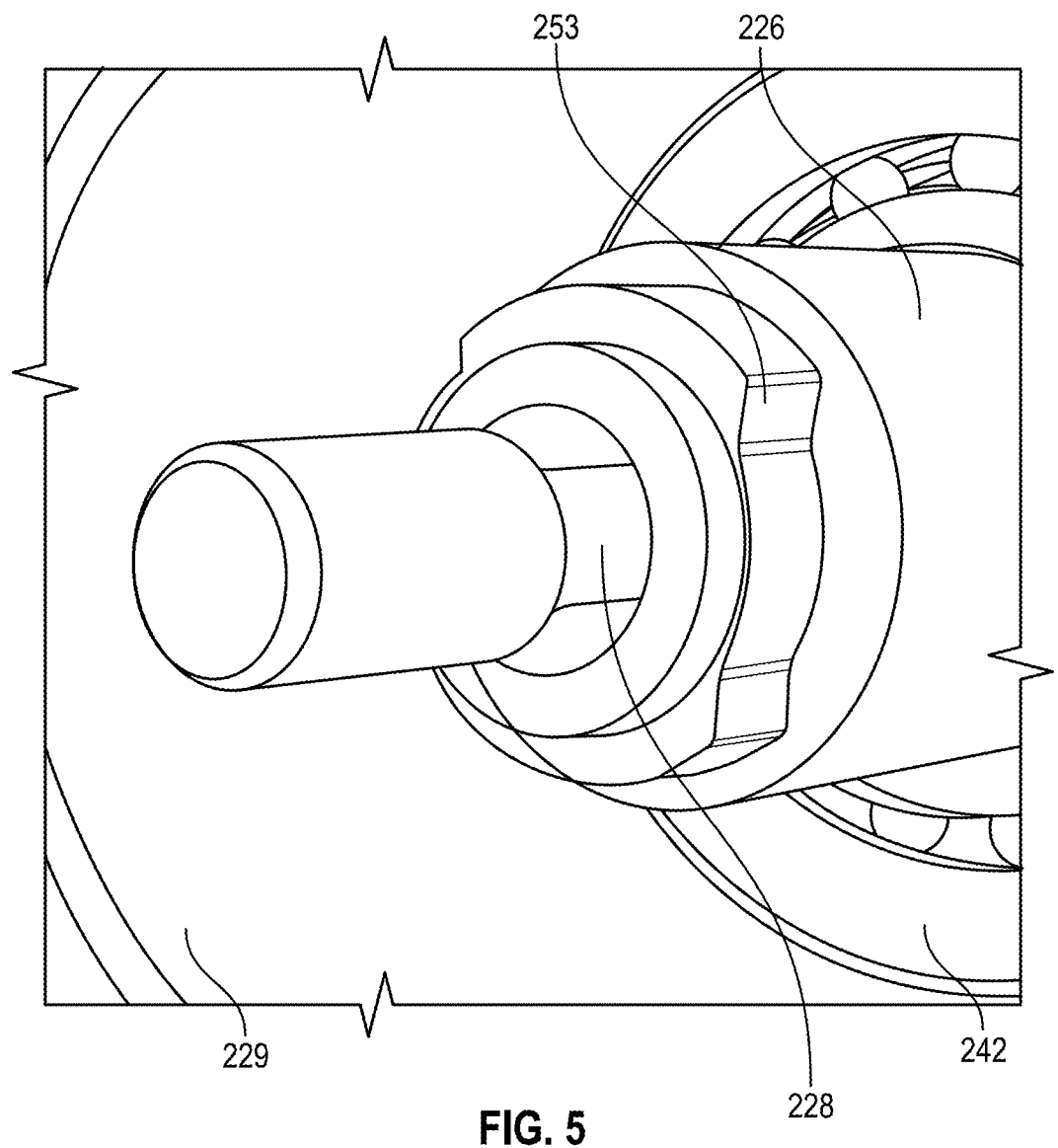
Figure 6A:
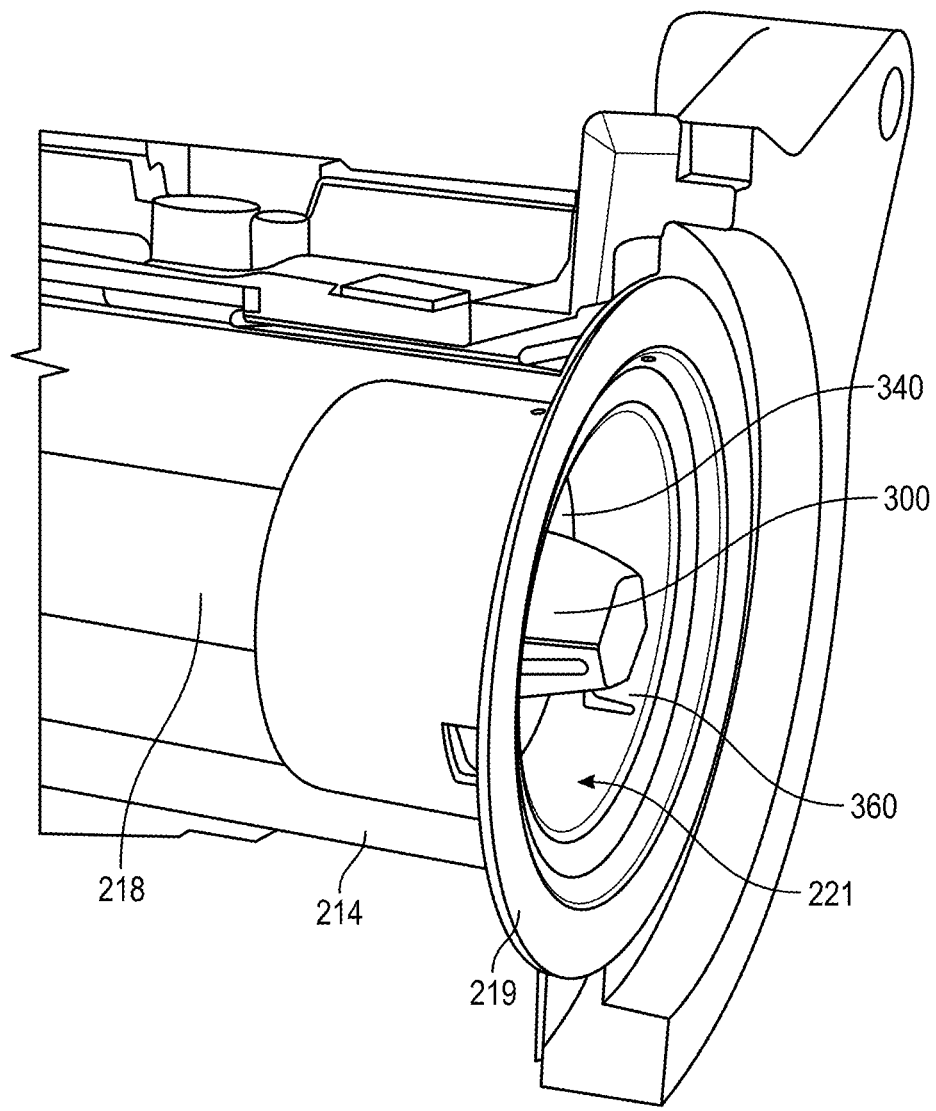
Figure 6B:
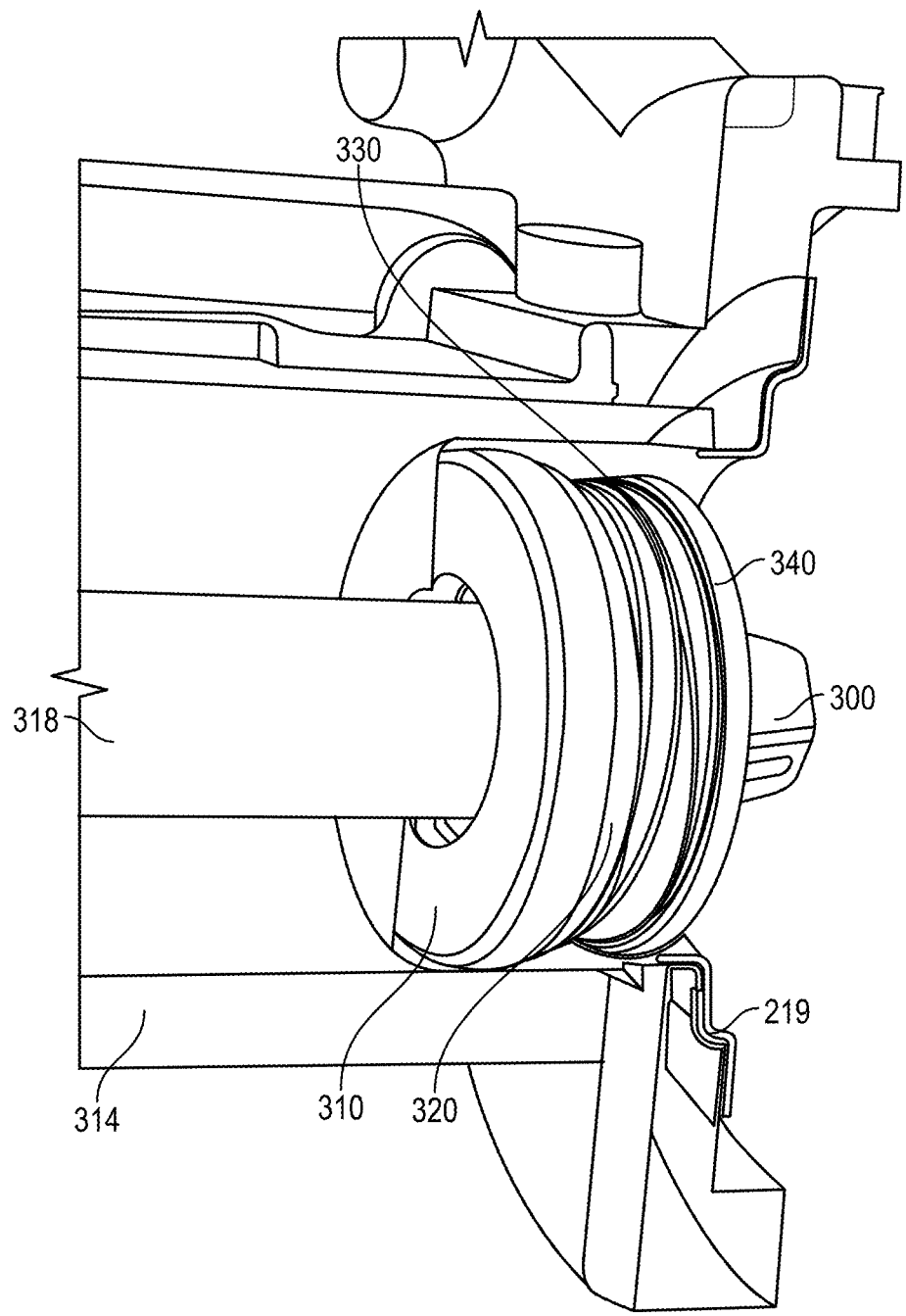
Figure 6C:
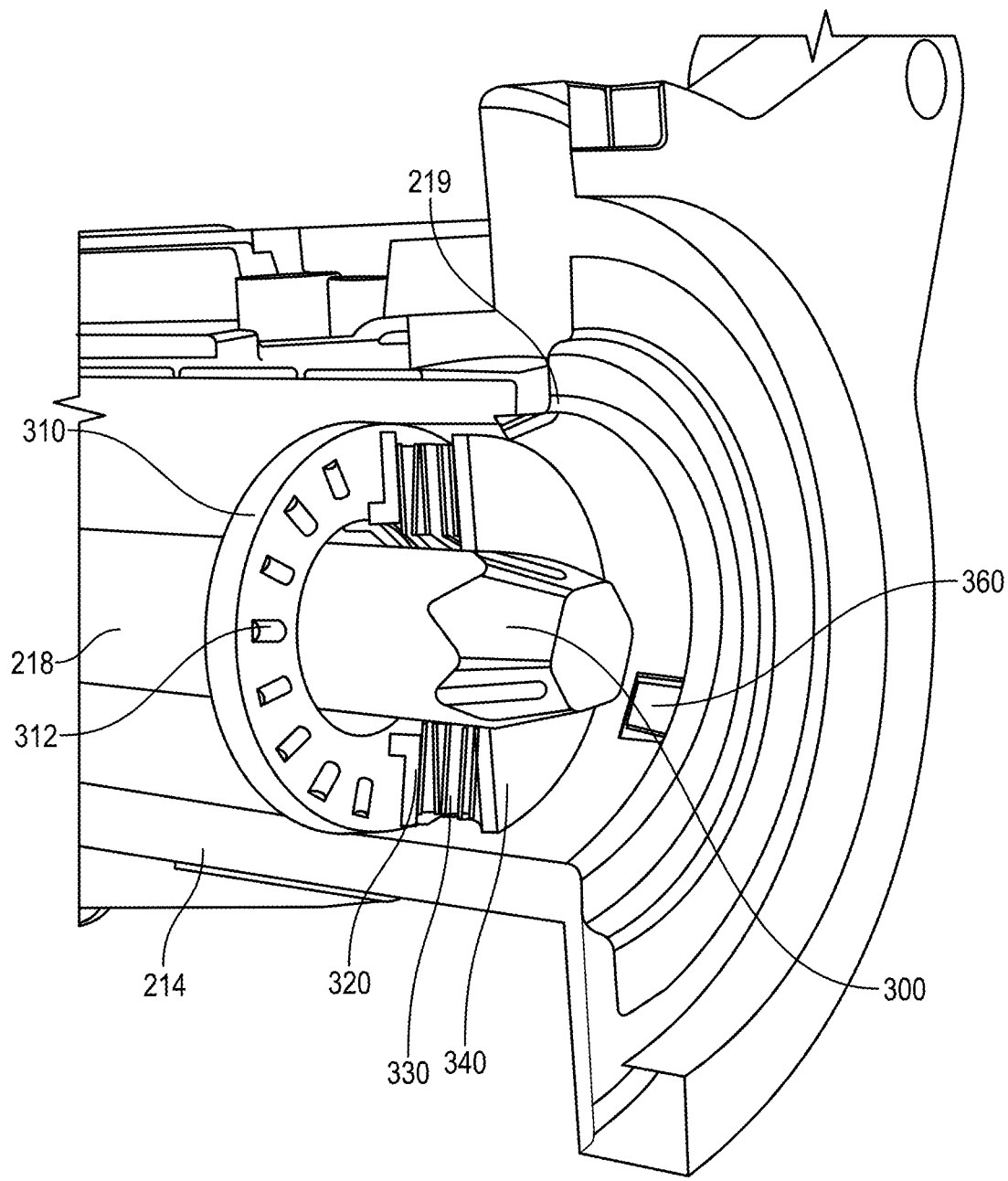
Figure 6D:
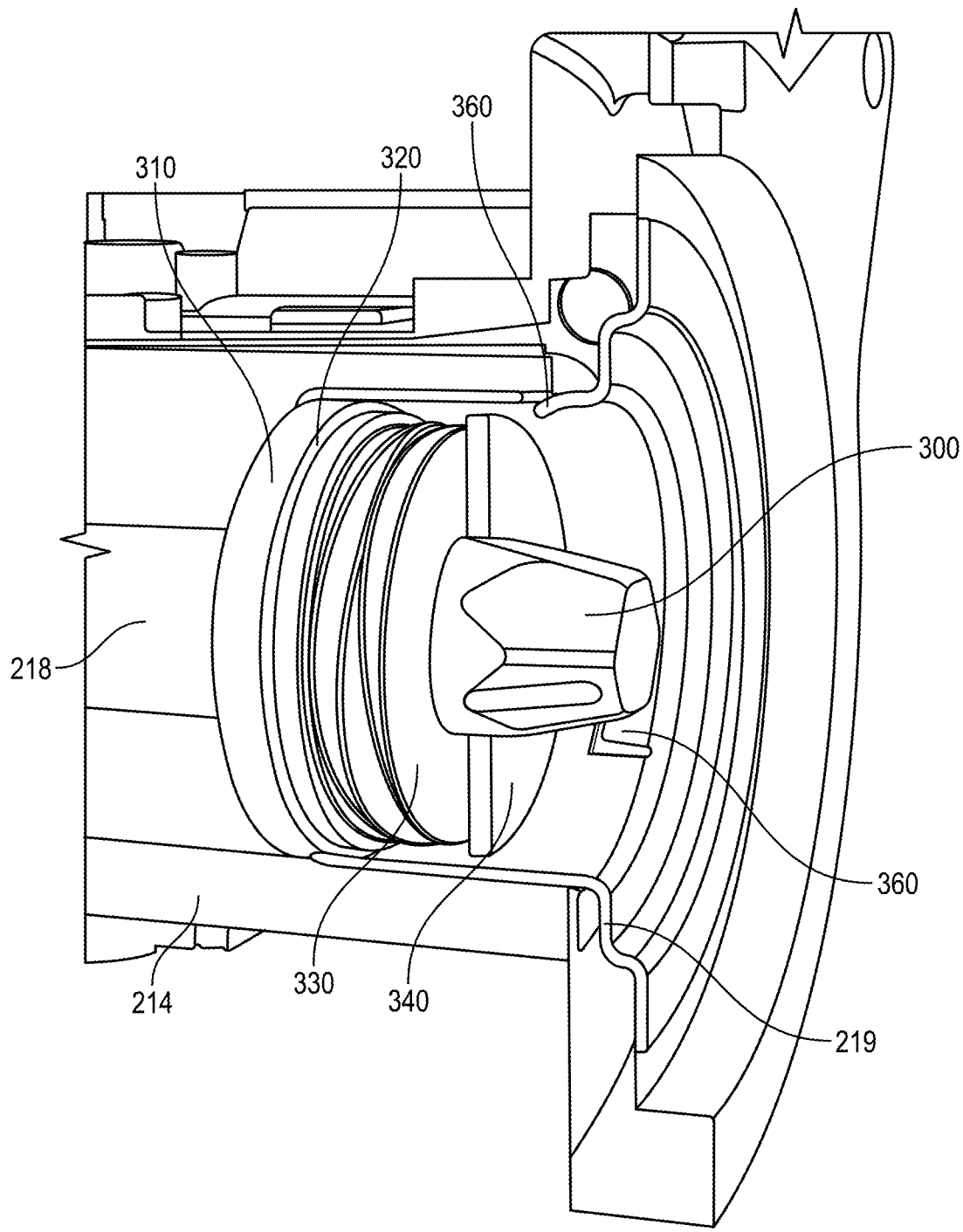
Figure 6E:
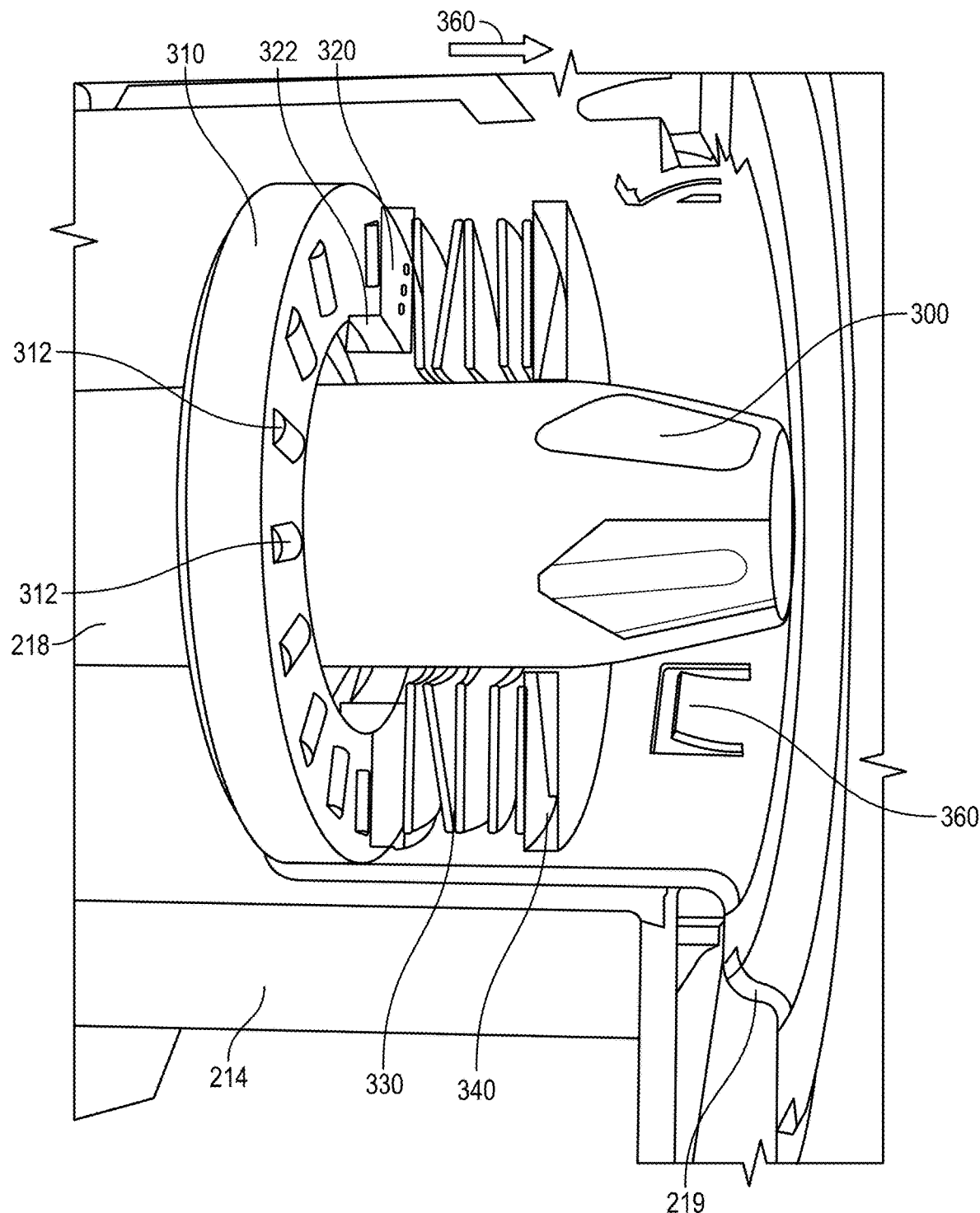
Figure 7:
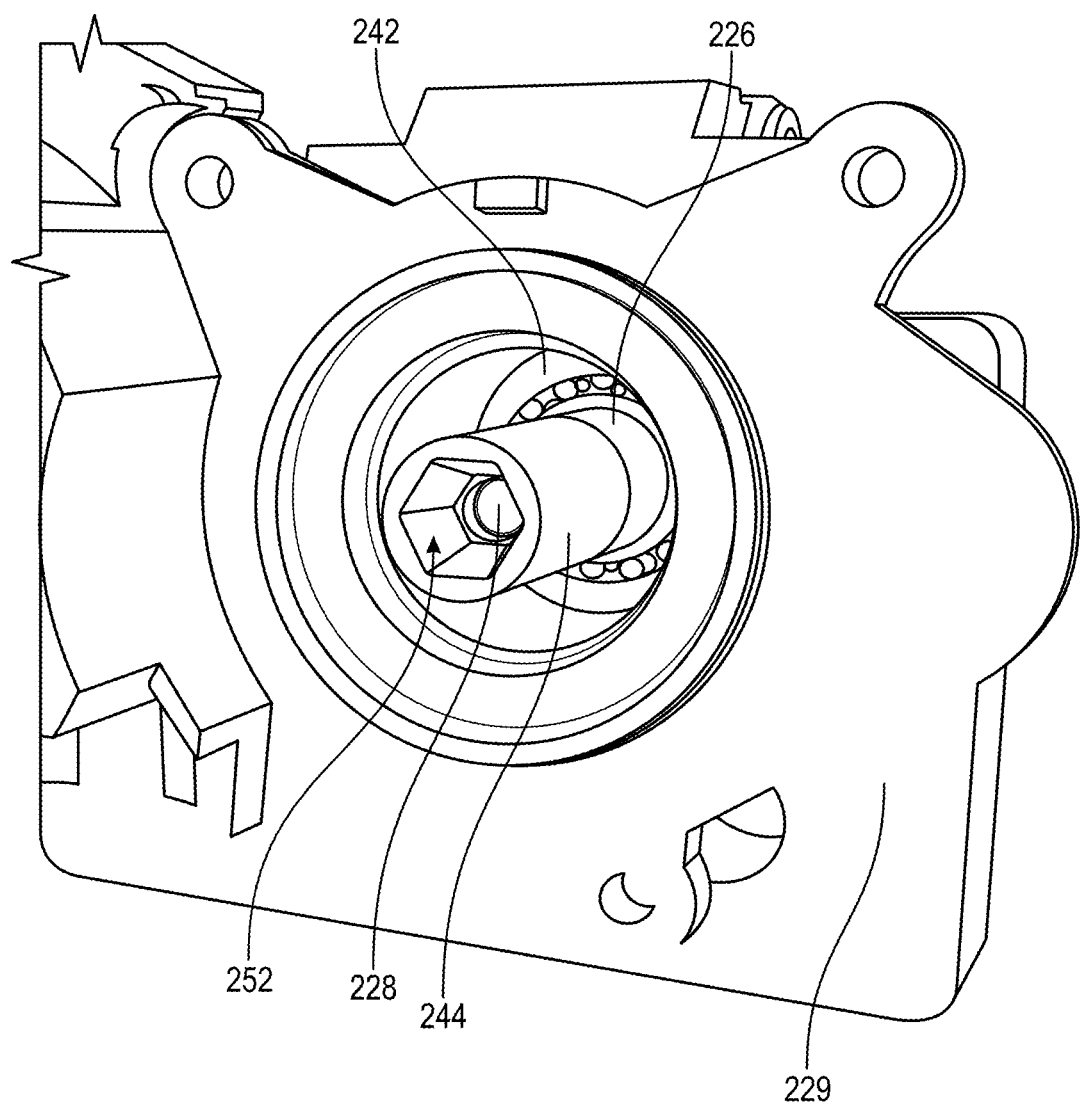

FIG. 3, which is defined by FIGS. 3A and 3B, shows various components and structures that may define a column-actuator interface that includes an adapter in accordance with an example embodiment;

FIG. 4 is a partially isolated, perspective view of a sleeve element in accordance with an example embodiment;

FIG. 5 is a partially isolated, perspective view of a portion of a stub shaft that interfaces with the sleeve element in accordance with an example embodiment;

FIGS. 6A, 6B, 6C, 6D and 6E show various views of components of a compressive load assembly in accordance with an example embodiment; and FIG. 7 is a perspective view of the stub shaft and sleeve element exposing an engagement interface in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
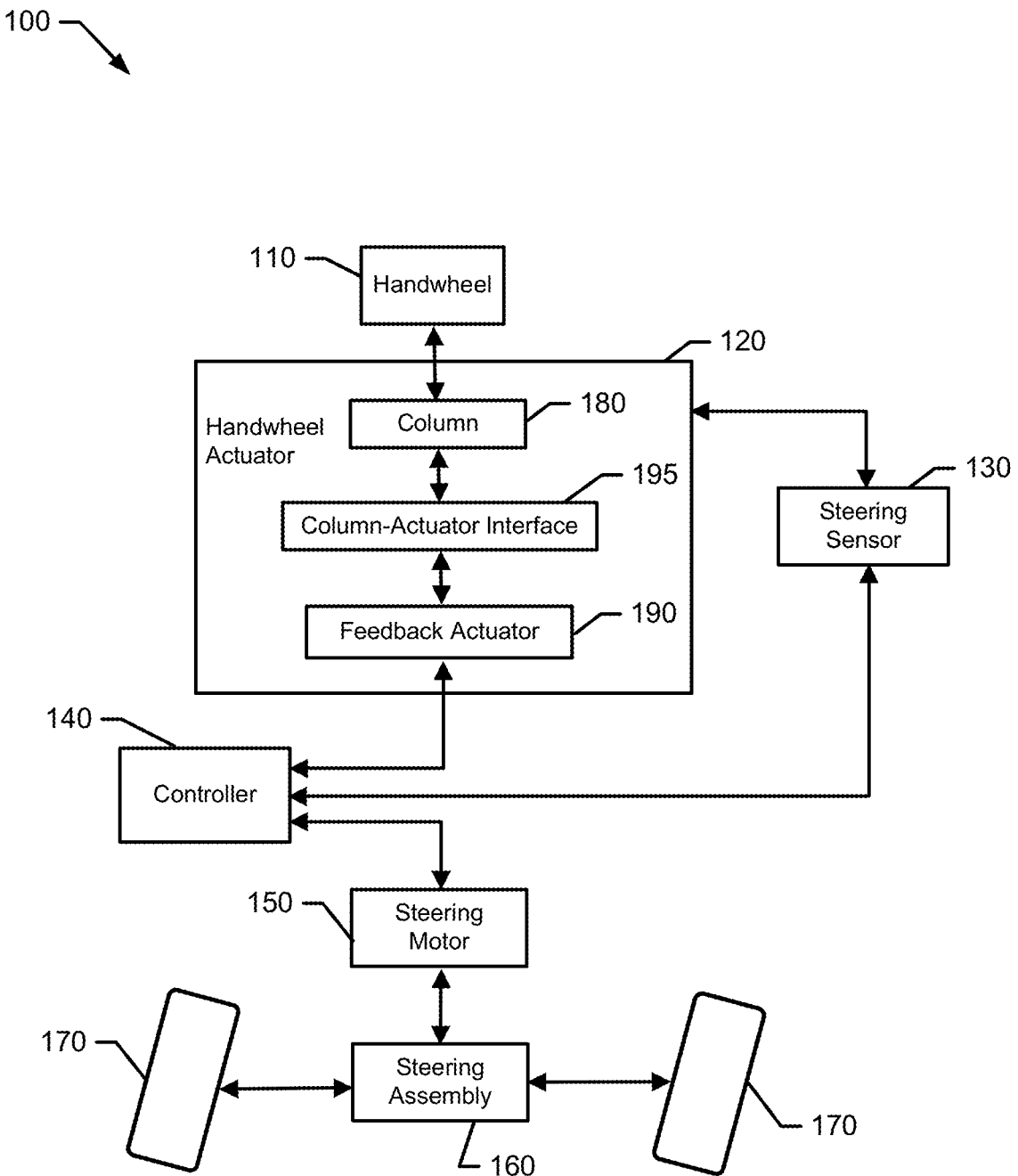
FIG. 1 illustrates a block diagram of a steer by wire system of a vehicle in accordance with an example embodiment.

As noted above, it may be desirable to define certain component interfaces to consistently meet certain standards or specifications to ensure compatibility regardless of manufacturer. One such interface may be associated with steer by wire systems, and may relate to the feedback actuator of such a system. FIG. 1 illustrates a block diagram of some components of a steer by wire system 100 in accordance with an example embodiment. Of note, although the components of FIG. 1 may be part of or operably coupled to the vehicle, it should be appreciated that such connection(s) may be either direct or indirect. Moreover, some of the components of the steer by wire system 100 may be connected to the vehicle via intermediate connections to other components either of the chassis or of other electronic and/or mechanical systems or components.

Referring now to FIG. 1, the steer by wire system 100 may include a handwheel 110, which is located with a vehicle for manual manipulation by a driver or operator of the vehicle. The handwheel 110 is typically a traditional steering wheel, and therefore may be round and rotatable about an axis. However, other structures could be substituted for implementation as the handwheel 110 in alternative embodiments. The movements (typically rotations) of the handwheel 110 are communicated to a handwheel actuator 120 that is operably coupled to the handwheel 110. The handwheel 110 and/or the handwheel actuator 120 may also be operably coupled to one or more steering sensors 130 that may be configured to determine steering angle and/or torque input at the handwheel 110. In some cases, the steering sensor 130 (or sensors) may be part of the handwheel actuator 120. However, the steering sensor 130 could alternatively be a separate component.

In an example embodiment, the handwheel actuator 120 and/or the steering sensor 130 may be operably coupled to a controller 140. In some cases, the controller 140 may be part of an electronic control system of the vehicle. The controller 140 may therefore also be configured to perform other tasks related or not related to steer by wire control or performance management. However, the controller 140 could be a dedicated or standalone controller in some cases. Processing circuitry (e.g., a processor and memory) at the controller 140 may process the information received by, for example, running one or more control algorithms based on the information received. The control algorithms may include instructions that can be stored by the memory for retrieval and execution by the processor. In some cases, the memory may further store one or more tables (e.g., look up tables) and various calculations and/or applications may be executed using information in the tables and/or the information to generate outputs to a steering motor 150 based on the inputs received (e.g., from the handwheel actuator 120 and/or steering sensor 130).

In an example embodiment, the steering motor 150 (or steering actuator) may be an electrical motor that is operably coupled to a steering assembly 160 to drive the steering assembly 160 to turn wheels 170 (typically front wheels) of the vehicle. The steering assembly 160 may include one or more of a chain, flexible looped drive member, steering gear(s), rack and pinion, direct drive, or other structures that communicate steering torque to the wheels 170.

In an example embodiment, the handwheel actuator 120 may include subcomponents that may be made by different manufacturers, suppliers or sourcing agents, which are often simply referred to as original equipment manufacturers (OEMs). In this regard, for example, the handwheel actuator 120 may include a column 180 and a feedback actuator 190. The column 180 may include structural interfaces to the handwheel 110 to enable the rotational inputs at the handwheel 110 to be communicated to the controller 140 for generation of inputs to the steering motor 150. The feedback actuator 190 may include an electric motor and other components that are designed to provide feedback that gives operators a tactile response similar to that of conventional mechanical or hydraulic steering systems.

As noted above, the use of the handwheel actuator 120 creates significant flexibility in terms of enabling designers to easily change steering ratios and torque resistances or otherwise modify steering functionality. In this regard, for example, relatively simple software commands may enable such alteration instead of any physical component replacement or manipulation. Additionally, by not mechanically linking the handwheel 110 to the wheels 170, greater flexibility is unlocked in terms of other aspects of vehicle design, including stowable handwheels and/or steering columns for self-driving options coming in the future.

Although it may be possible for the entire handwheel actuator 120 to be manufactured by a single OEM, the nature of competition in the global automotive sector, and the fact that different areas of specialization may be required to manufacture the column 180 than those required for manufacture of the feedback actuator 190, may dictate that different OEMs could be used for each part. Moreover, the fact that it may be desirable to have the column 180 and the feedback actuator 190 be separate serviceable and individually replaceable components so that service life exhaustion of one does not necessitate replacement of the other tends to motivate the modularization of the column 180 and the feedback actuator 190 as separate modules or components with an interface (e.g., a column-actuator interface 195) therebetween. If the same OEM produced both the column 180 and the feedback actuator 190, the OEM would own the interfaces (including the column-actuator interface 195) therebetween. The OEM could theoretically define the interface anyway they wanted. However, if different OEMs were involved, or the potential for different OEMs existed, then the column-actuator interface 195 may become a potentially limiting component, and the incentive becomes strong to standardize or limit variation of certain aspects of the column-actuator interface 195.

In order to provide a robust connection between the feedback actuator 190 and the column 180, while still allowing for the potential of separate sourcing and servicing of the components, example embodiments may provide structures for defining the column-actuator interface 195. Notably, components that form the column-actuator interface 195 may be part of the feedback actuator 190 or the column 180, and need not be separate components or modules themselves. Thus, for example, in some cases, the column-actuator interface 195 may be defined as components of the column 180 and/or the feedback actuator 190 that interface with each other to operably couple the column 180 to the feedback actuator 190. However, some components of the column-actuator interface 195 may be considered to be part of a separate module from each or either of the column 180 and the feedback actuator 190.

Figure 2:
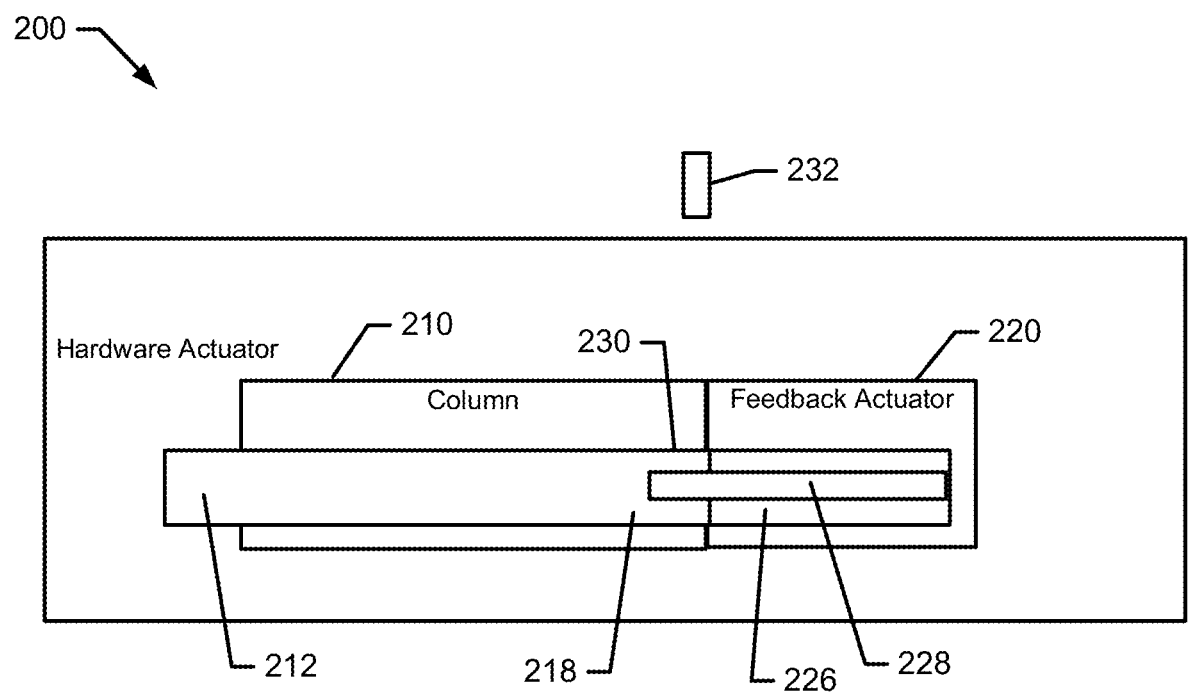
FIG. 2 illustrates a schematic view of a handwheel actuator in accordance with an example embodiment.

FIGS. 2-7 demonstrate some specific structures that may be used to implement various aspects of the steer by wire system 100 of FIG. 1. FIG. 2 illustrates a schematic view of a handwheel actuator 200, which may be an example of the handwheel actuator 120 of FIG. 1. In FIG. 2, a column portion (or column 210) and feedback actuator portion (or feedback actuator 220) may be understood to be separable modules or component that may be joined at an interface therebetween (which form an example of the column-actuator interface 195 of FIG. 1). The column 210 is an example of the column 180, and the feedback actuator 220 is an example of the feedback actuator 190 of FIG. 1.

FIG. 3, which is defined by FIGS. 3A and 3B, shows various components and structures that may define an interface between the column 210 and the feedback actuator 220 and therefore form portions of the column-actuator interface 195 of FIG. 1. In this regard, FIG. 3A is a perspective view of the handwheel actuator 200, and FIG. 3B illustrates a cross section view through a longitudinal center of the handwheel actuator 200 of FIG. 3A.

Referring to FIGS. 2 and 3, the column 210 may include an upper steering shaft 212 that may be supported or held in place by an upper steering jacket 214. The upper steering jacket 214 may be operably coupled to a lower column casting 216. The upper steering jacket 214 and the lower column casting 216 may combine to form a housing of the column 210. The upper steering shaft 212 may be operably coupled to a handwheel (e.g., handwheel 110) at one end (i.e., a proximal end), and may be operably coupled to (or integrally formed with) a lower steering shaft 218 at the opposing end (i.e., a distal end thereof relative to the handwheel 110). The upper steering shaft 212 and the lower steering shaft 218 may combine to form a steering shaft or column shaft of the column 210.

In an example embodiment, the upper steering jacket 214 may be operably coupled to the lower column casting 216 to enclose the lower steering shaft 218 entirely therein. In some cases, the lower column casting 216 and the upper steering shaft 212 may be operably coupled in such a way that permits (e.g., responsive to impact) the upper steering jacket 214 to slide deeper into the lower column casting 216 (e.g., telescopically retracting) to absorb impact. As such, a degree to which the upper steering jacket 214 can move within the lower column casting 216 may define how much movement of the handwheel 110 may be possible in an impact scenario.

Although not required (and actually not included in the example embodiment of FIG. 3B), FIG. 2 shows that the lower column casting 216 may include, in some cases, an access port 230 formed therein. When included, the access port 230 may be an aperture or opening in a lateral side of the lower column casting 216 at a portion of the lower column casting 216 that is proximate to (although in some cases spaced apart slightly from) the feedback actuator 220. The access port 230 may allow visibility and physical access into the lower column casting 216, and more specifically grant access to a front end of the lower steering shaft 218, which may be a distal end of the lower steering shaft 218 relative to the upper steering shaft 212. A cover 232 may be provided to fit within or close the access port 230 to prevent access to the inside of the lower column casting 216. Removal of the cover 232 may therefore provide the access described above.

The feedback actuator 220 may include a motor that is operably coupled to a driven shaft (e.g., stub shaft 226) that is generally coaxial with the column shaft. The operable coupling between the motor and the stub shaft 226 may be accomplished in many ways depending on the orientation and nature of the motor. For example, the motor could have a motor shaft that extends in the forward direction (i.e., relative to the front of the vehicle), which may be parallel to and offset from an axis of the upper steering shaft 212 and the lower steering shaft 218. However, the motor shaft could alternatively be perpendicular to the column shaft or inline therewith in other alternative arrangements. As such, it may be appreciated that the motor shaft could be directly or indirectly coupled to the stub shaft 226 (e.g., via a flexible looped drive member, gear assembly, worm gear, etc.) in a number of different ways. The stub shaft 226 may be coaxial with a torsion bar 228 that is operably coupled to the stub shaft 226 to rotate with the stub shaft 226. The motor and the stub shaft 226 may provide the feedback described above, which is fed through the lower steering shaft 218 and the upper steering shaft 212 to the driver via the handwheel 110.

The stub shaft 226 and the torsion bar 228 may all be located in or housed within a feedback actuator casting 229. In some cases, the motor and any components providing direct or indirect coupling between the motor and the stub shaft 226 may also be housed in the feedback actuator casting 229. However, a proximal end of the torsion bar 228 (relative to the column shaft) and a proximal end of the stub shaft 226 (also relative to the column shaft) may each protrude slightly out of, or at least be accessible (prior to assembly with the column 210), via an opening formed in the feedback actuator casting 229. The opening formed in the feedback actuator casting 229 may be adjacent to an opening of the column 210 at the forward end of the lower column casting 216 (e.g., where the column shaft terminates).

In this example, the upper and lower steering shafts 212 and 218 may act as a single column shaft although they are physically separate, but joined components. The column shaft may be supported proximate to each opposing end thereof by a respective bearing assembly or other support means. Thus, rotation of the column shaft within the column 210 may be fully supported at both ends. In an example embodiment, a first column shaft bearing 240 (or rear column bearing) may be disposed at an end of the upper jacket 214 (e.g., a distal end of the upper jacket 214 relative to the lower column casting 216). However, instead of having a second column shaft bearing disposed at or proximate to an end of the lower steering shaft 218, which may also be proximate to an end of the lower column casting 216 (e.g., a proximal end relative to the feedback actuator 220), example embodiments may be supported instead by a sleeve element 244 and a compressive loading assembly 245 that facilitates operable coupling of the lower steering shaft 218 to the torsion bar 228 and the stub shaft 226 via the sleeve element 244.

The compressive loading assembly 245 may include a collection of components that apply a compressive load to the joint between the lower steering shaft 218 and the sleeve element 244 (and therefore also to the stub shaft 226 and torsion bar 228 via the sleeve element 244). The compressive load provided to the joint prevents shaft separation under torsion, thereby eliminating any need for a physical fastener between the lower steering shaft 218 and the torsion bar 228. The compressive loading assembly 245 therefore enables the handwheel actuator 200 to effectively handle all build variations between the column 210 and the feedback actuator 220.

In an example embodiment, the compressive loading assembly 245 may be housed in or otherwise provided at a bearing retention plate 219. The bearing retention plate 219 may be press fit into the opening formed in the end of the lower column casting 216. The bearing retention plate 219 may have an interface portion that mates with the lower column casting 216. From the interface portion, the bearing retention plate 219 may extend inwardly from the end of the column 210 toward the first column shaft bearing 240. The inwardly extending portion of the bearing retention plate 219 may be substantially cylindrical in shape and may define a chamber or cup inside with the compressive loading assembly 245 is located. The compressive loading assembly 245 may, as discussed in greater detail below, exert compressive forces extending away from the bearing retention plate 219 and toward the sleeve element 244 and both the stub shaft 226 and the torsion bar 228. An outer portion of the bearing retention plate 219 may be open toward the feedback actuator 220 and define a coupling chamber 221 formed between the compressive loading assembly 245 and the feedback actuator 220.

Meanwhile, the feedback actuator 220 may also include one or two sets of bearings to support the stub shaft 226 at both ends thereof or, as shown in FIG. 3B, at a middle portion of the stub shaft 226. In this regard, a feedback actuator bearing 242 (or forward actuator bearing), which may actually include two adjacent bearings in this example, may be provided proximate to a mid-portion of the stub shaft 226. The feedback actuator bearing 242 may be press fit into the feedback actuator casting 229. Accordingly, the first column shaft bearing 240 and the feedback actuator bearing 242 may combine to support the column shaft (i.e., the upper steering shaft 212 and the lower steering shaft 218), the sleeve element 244, and the stub shaft 226, when the column shaft and the stub shaft 226 are joined together as described herein.

The sleeve element 244 may be a torsion limiting sleeve, that interfaces with the stub shaft 226 and torsion bar 228 in such a way as to prevent the torsion bar 228 from exceeding any torque ratings associated therewith. Thus, the sleeve element 244 may form a torque limiting interface (components of which are shown in FIGS. 4 and 5) at its coupling interface with the stub shaft 226. In this regard, for example, the sleeve element 244 may have a fixed connection (e.g., via a press fitting) to the torsion bar 228 at a proximal end of the torsion bar 228. Meanwhile, the sleeve element 244 may have a space between portions of the sleeve element 244 and the corresponding portions of the stub shaft 226. The space may be eliminated and direct contact and torque transfer between the stub shaft 226 and the sleeve element 244 if the torsion bar 228 reaches a certain point of deformation during torque application. Torque may thereafter be transferred to the stub shaft 226 to protect the torsion bar 228. In some cases, the sleeve element 244 may itself be considered to be a stub shaft, and may be considered an upper stub shaft (implying that the stub shaft 226 would then be considered a lower stub shaft).

In an example embodiment, the torsion bar 228 may be press fit into the stub shaft 226. The stub shaft 226 may be press fit into the feedback actuator bearing 242, and the feedback actuator bearing 242 may be press fit into the feedback actuator casting 229. The torque limiting interface may be defined by a shaped cavity 251 formed at a proximal end (relative to the stub shaft 226) of the sleeve element 244 and a shaped protrusion 253 formed at the stub shaft 226 to interface with the shaped cavity 251 as shown in FIGS. 4 and 5. In the example shown, the proximal end of the torsion bar 228 is shown in FIG. 5 as being a cylindrical member, and the cylindrical member of the proximal end of the torsion bar 228 is inserted (via press fit) into the sleeve element 244, as described above. The shaped cavity 251 may then interface with the shaped protrusion 253 to transfer torque between the sleeve element 244 and the stub shaft 226 to protect the torsion bar 228 at a certain point of deformation during torque application, as described above.

The sleeve element 244 may be a cast metallic component in some embodiments. The sleeve element 244 may have a diameter that is substantially similar to the diameter of the stub shaft 226, and may have a cylindrical outer periphery that extends from its proximal end to its distal end. The sleeve element 244 may terminate at its distal end (proximate to the column shaft) with an engagement interface 252 that may receive a proximal end of the column shaft (relative to the feedback actuator 220). The proximal end of the column shaft (and more specifically of the lower steering shaft 218) may have a shaped terminus 300 that is configured to interface with the engagement interface 252 as shown in FIGS. 6 and 7. The shaped terminus 300 may include six protruding planar faces that taper toward each other (but do not join) while extending away from the upper steering shaft 212. Thus, the shaped terminus 300 may be a tapered hexagonal protrusion. In some cases, the planar faces may also have ribs or other features located thereon. However, such ribs are not required, and the shape of the shaped protrusion generally could also be modified in other examples.

The shaped terminus 300 may be inserted into engagement interface 252 when the upper steering jacket 214 is joined to the feedback actuator casting 229 (e.g., via press fit, bolting, or other fixing means). Meanwhile, the engagement interface 252 be shaped to receive the shaped terminus 300 and therefore may effectively be a shaped receiver having six planar faces that are recessed (substantially matching the degree of taper of the protruding planar faces of the shaped terminus 300). Moreover, the compressive loading assembly 245 may operate to ensure that the shaped terminus 300 is firmly seated within the shaped receiver of the engagement interface 252 when the column shaft is mated to the sleeve element 244 upon fixing of the upper steering jacket 214 to the feedback actuator casting 229.

In an example embodiment, the compressive loading assembly 245 may include a needle bearing 310, an indexed plate 320, a biasing member (e.g., spring 330) and a spring plate 340. The needle bearing 310 may have an outer diameter that is about equal to the inner diameter of the bearing retention plate 219 so that the needle bearing 310 may essentially be fixed within the bearing retention plate 219. An inner diameter of the needle bearing 310 may be slightly larger than a diameter of the lower steering shaft 218. However, the needle bearing 310 may further include a radial trench 312 of removed material from the inner diameter of the side of the needle bearing 310 that faces the indexed plate 320. The radial trench 312 may therefore be recessed into a side face of the needle bearing 310 upon which a plurality of rollers 312 are provided. The rollers 312 may be orientated to support the indexed plate 320 to permit or enable rotation of the indexed plate 320. The indexed plate 320 may include a collar portion 322 that extends into the radial trench 312. The collar portion 322 may have a larger diameter than the outer diameter of the lower steering shaft 218, and an outer diameter of the indexed plate 320 may be less than the outer diameter of the needle bearing 310. These relative diameter differences may ensure that the indexed plate 320 can rotate independent of the lower steering shaft 218 to avoid any friction being created therebetween, or between the indexed plate 320 and the bearing retention plate 219.

The spring 330 may be a wave spring, wave washer, coil spring, or the like. The spring 330 may also be sized with inner and outer diameters that leave space between the spring 330 and both the lower steering shaft 218 and the bearing retention plate 219. Thus, the spring 330 can rotate, free of any significant friction, while exerting a force directed away from the indexed plate 320, which is fixed in axial position within the bearing retention plate 219 by the needle bearing 310. The force exerted (shown by arrow 360 in FIG. 6E).

The spring plate 340 may be affixed (e.g., welded, crimped, press fit, etc.) to the lower steering shaft 218 proximate to the shaped terminus 300. Meanwhile, the needle bearing 310, the indexed plate 320 and the spring 330 may be captured between the bearing retention plate 219 and the spring plate 340. Accordingly, the spring plate 340 may tend to be urged or pushed away from the bearing retention plate 219 by the spring 330. When the column 210 is operably coupled to the feedback actuator 220, the urging (in the direction of arrow 360) provides a compressive force to enable the column shaft (i.e., the upper steering shaft 212 and the lower steering shaft 218) and the torsion bar 226 and stub shaft 228 to be supported by the bearings (e.g., the first column shaft bearing 240 and the feedback actuator bearing 242), when the column shaft and the stub shaft 226 are joined together. This compressive force avoids side loading due to concentricity of the components of the handwheel actuator 200, and effectively addresses lash. As such, any slight misalignment of the centerlines of the column shaft (i.e., the upper steering shaft 212 and the lower steering shaft 218) and sleeve element 244, the torsion bar 226 and stub shaft 228, and corresponding small amounts of runout, can be tolerated without difficulty or any undesirable side effects.

The operation of the spring 330 will, however, also tend to push the lower steering shaft 218 away from the upper steering shaft 212 (potentially separating the two) when the column 210 and the feedback actuator 210 are not attached to each other. To prevent this, one or more retention members 370 may be disposed in the bearing retention plate 219. In this regard, for example, the bearing retention plate 219 forms a cup portion that defines the coupling chamber 221. At or near a distal end of the coupling chamber 221, the retention members 370 may be provided to extend inwardly into the coupling chamber 221 to prevent the spring plate 340 from exiting the coupling chamber 221. In this regard, the diameter of the spring plate 340 may be smaller than the inner diameter of the bearing retention plate 219 at the coupling chamber 221, but larger than a distance between the retention members 370 that extend inwardly to restrict movement of the spring plate 340.

Example embodiments may therefore also provide a handwheel actuator for a steer by wire system. The handwheel actuator may include a compressive loading assembly, a feedback actuator and a column for operably coupling a handwheel to the handwheel actuator. The column may operably couple a handwheel to the handwheel actuator. The column may include a column shaft extending from a first end of the column to a second end of the column. The feedback actuator may be operably coupled to the second end of the column. The feedback actuator may provide tactile feedback to an operator responsive to movement of the handwheel. The feedback actuator may include a torsion bar substantially coaxial with the column shaft. The compressive loading assembly may be disposed at the second end of the column to operably couple the column shaft and the torsion bar under a compressive load when the column is joined to the feedback actuator.

The handwheel actuator of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the column shaft may be radially supported relative to a housing of the column by a column shaft bearing assembly disposed proximate to the first end of the column. The torsion bar may be operably coupled to a stub shaft that extends at least partially around the torsion bar. The torsion bar and the stub shaft may be radially supported by a feedback actuator bearing operably coupled to the stub shaft. In an example embodiment, the feedback actuator bearing may be disposed proximate a middle of the stub shaft, and the column shaft bearing and the feedback actuator bearing may be the only radial support bearings in the handwheel actuator. In some cases, the stub shaft may be operably coupled to a sleeve element, and the sleeve element may be operably coupled to the column shaft to facilitate torque transfer between the column shaft and the torsion bar proximate to the compressive loading assembly. In an example embodiment, the stub shaft may be operably coupled to the sleeve element via a torque limiting interface. In some cases, the sleeve element may include an engagement interface shaped to receive a shaped terminus of the column shaft, and the compressive loading assembly urges the column shaft toward the sleeve element. In an example embodiment, the compressive loading assembly may include a needle bearing, an indexed plate, a biasing member, and a spring plate. In some cases, the spring plate may be fixed to the column shaft proximate the shaped terminus. In an example embodiment, the needle bearing, the indexed plate, the biasing member and the spring plate may each be disposed in a coupling chamber of a bearing retention plate disposed at the second end of the column. In some cases, the needle bearing may be fixed inside the coupling chamber and may define a radial trench inside which the indexed plate is rotatably mounted. In an example embodiment, the spring plate, the indexed plate and the biasing member may each have an outer diameter that is less than an outer diameter of the needle bearing. In some cases, the coupling chamber may include one or more retention members extending into the coupling chamber to retain the spring plate in the coupling chamber against biasing forces exerted by the biasing member. In an example embodiment, the biasing member may include a wave spring. In some cases, the compressive loading assembly may operably couple the column shaft and the torsion bar without any physical fastener due to the compressive load.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A Handwheel actuator for a steer-by-wire system, the handwheel actuator comprising:
   a column for operably coupling a handwheel to the handwheel actuator, the column comprising a column shaft extending from a first end of the column to a second end of the column;
   a feedback actuator operably coupled to the second end of the column, the feedback actuator providing tactile feedback to an operator responsive to movement of the handwheel, the feedback actuator comprising a torsion bar substantially coaxial with the column shaft; and
   a compressive loading assembly disposed at the second end of the column to operably couple the column shaft and the torsion bar under a compressive load when the column is joined to the feedback actuator.

2. The handwheel actuator of claim 1, wherein the column shaft is radially supported relative to a housing of the column by a column shaft bearing assembly disposed proximate to the first end of the column,
   wherein the torsion bar is operably coupled to a stub shaft that extends at least partially around the torsion bar, and wherein the torsion bar and the stub shaft are radially supported by a feedback actuator bearing operably coupled to the stub shaft.

3. The handwheel actuator of claim 2, wherein the feedback actuator bearing is disposed proximate a middle of the stub shaft, and
wherein the column shaft bearing and the feedback actuator bearing are the only radial support bearings in the handwheel actuator.

4. The handwheel actuator of claim 2, wherein the stub shaft is operably coupled to a sleeve element, and
wherein the sleeve element is operably coupled to the column shaft to facilitate torque transfer between the column shaft and the torsion bar proximate to the compressive loading assembly.

5. The handwheel actuator of claim 4, wherein the stub shaft is operably coupled to the sleeve element via a torque limiting interface.

6. The handwheel actuator of claim 4, wherein the sleeve element comprises an engagement interface shaped to receive a shaped terminus of the column shaft, and
wherein the compressive loading assembly urges the column shaft toward the sleeve element.

7. The handwheel actuator of claim 6, wherein the compressive loading assembly comprises:
a needle bearing;
an indexed plate;
a biasing member; and
a spring plate.

8. The handwheel actuator of claim 7, wherein the spring plate is fixed to the column shaft proximate the shaped terminus.

9. The handwheel actuator of claim 8, wherein the needle bearing, the indexed plate, the biasing member and the spring plate are each disposed in a coupling chamber of a bearing retention plate disposed at the second end of the column.

10. The handwheel actuator of claim 9, wherein the needle bearing is fixed inside the coupling chamber and defines a radial trench inside which the indexed plate is rotatably mounted.

11. The handwheel actuator of claim 10, wherein the spring plate, the indexed plate and the biasing member each have an outer diameter that is less than an outer diameter of the needle bearing.

12. The handwheel actuator of claim 9, wherein the coupling chamber comprises one or more retention members extending into the coupling chamber to retain the spring plate in the coupling chamber against biasing forces exerted by the biasing member.

13. The handwheel actuator of claim 7, wherein the biasing member comprises a wave spring.

14. The handwheel actuator of claim 1, wherein the compressive loading assembly operably couples the column shaft and the torsion bar without any physical fastener due to the compressive load.

15. A column for a handwheel actuator of a steer-by-wire system, the column comprising:
a column shaft extending from a first end of the column to a second end of the column to operably couple a handwheel to the handwheel actuator; and
a compressive loading assembly disposed at the second end of the column to operably couple the column shaft and a torsion bar of a feedback actuator under a compressive load when the column is joined to the feedback actuator,
wherein the feedback actuator is operably coupled to the second end of the column, the feedback actuator providing tactile feedback to an operator responsive to movement of the handwheel, and
wherein the torsion bar is substantially coaxial with the column shaft.

16. The column of claim 15, wherein the compressive loading assembly comprises:
a needle bearing;
an indexed plate;
a biasing member; and
a spring plate.

17. The column of claim 16, wherein the needle bearing, the indexed plate, the biasing member and the spring plate are each disposed in a coupling chamber of a bearing retention plate disposed at the second end of the column.

18. The column of claim 17, wherein the needle bearing is fixed inside the coupling chamber and defines a radial trench inside which the indexed plate is rotatably mounted, and
wherein the spring plate, the indexed plate and the biasing member each have an outer diameter that is less than an outer diameter of the needle bearing.

19. The column of claim 17, wherein the coupling chamber comprises one or more retention members extending into the coupling chamber to retain the spring plate in the coupling chamber against biasing forces exerted by the biasing member.

* * * * *